3,146,059
EVAPORATION-SUPPRESSING AGENTS AND METHOD OF THEIR PRODUCTION
Masaomi Suzuki, Chigasaki, Kanagawa, Yoshiyuki Shinohara, Ootake, Hiroshima, and Yoshiaki Mihara, Masujiro Ooka, and Tatsuo Tomioka, Tokyo, Japan, assignors to Nikken Chemicals Co., Ltd., Tokyo, Japan, a corporation of Japan
No Drawing. Filed Nov. 10, 1958, Ser. No. 772,723
Claims priority, application Japan Nov. 20, 1957
4 Claims. (Cl. 21—60.5)

This invention relates to a series of new organic compounds which suppress evaporation of water and are effective to inhibit loss of water, fall of water temperature and further drying of soil, and to a method for the production thereof and more particularly to normal aliphatic alcohols which have the ability to suppress evaporation of water and their derivatives as well as the agents which are added to facilitate the spreading of these agents on water surface, and to method for the production thereof.

An object of this invention is to produce new evaporation-suppressing agents which are effective in the suppressing of evaporation of water and in the inhibiting of loss of water, fall of water temperature and drying of soil, and which may be easily used.

Another object of this invention is to obtain the agents, which have the above-mentioned effect and are prepared by adding urea, water-soluble salts of carboxy-methyl cellulose or water-soluble salts of alginic acid, to the ethylene oxide derivatives of normal aliphatic alcohols whose number of carbon atoms is 16 to 22.

Still another object of this invention is to obtain evaporation-suppressing agents by hydrogenating directly or after ester interchanging, the oil and fat of which contains glycerides consisting of at least one of the normal fatty acids whose number of carbon atoms is 16 to 22; removing the liberated glycerine; combining a mixture of aliphatic alcohols thus obtained with ethylene oxide and adding water-soluble salts of carboxymethyl cellulose or water-soluble salts of alginic acid to the said ethylene oxide derivatives of normal aliphatic alcohols.

A further object of this invention is to obtain evaporation-suppressing agents by adding water-soluble salts of carboxymethyl cellulose or water-soluble salts of alginic acid to a melted mixture of normal aliphatic alcohols whose number of carbon atoms is 16 to 22 and the surface active agents which in their hydrophobic group do not contain aromatic or quaternary ammonium radical which enlarge the intermolecular interstices.

Other objects, features and advantages of this invention will be apparent from the following detailed description.

The theoretical studies on water evaporation through a mono- or poly-molecular film of various materials spread over water surface to air or gaseous phase have been previously conducted and published [Langmuir, I., Journal of Physical Chemistry, volume 31, page 1719 (1927); Sebba, F., and Briscoe, H. V. A., Journal of the Chemical Society, page 106 (1940)]. The practical application, however, to use these materials to suppress evaporation of water, to raise the water temperature of paddy-rice fields and to reduce the loss of water due to evaporation in dams or water reservoirs, has not yet been fully exploited because there is no proper agent which has high evaporation-suppressing ability and at the same time can easily be handled and can be prepared at low price [Nelson, F. C., U.S. Patent No. 2,170,644; Bvell, W. B., and Robert, R. C, Journal of the American Water Works Association, volume 49, 397 (1957)].

The inventors of this application have studied the evaporation-suppressing and water temperature-raising actions of mineral, marine, vegetable oils and animal fats, such as petroleum, lamp-oil or normal aliphatic alcohols, and found that normal aliphatic alcohols whose number of carbon atoms is 16 to 30 had high evaporation-suppressing and water temperature-raising ability, more particularly, normal docosanol whose number of carbon atoms is 22 had the highest effect. In these studies the suppression rate of evaporation (which is expressed as the percentage of the difference between the weight of the water evaporated from the free water surface which is not treated by any agent and the weight of the water evaporated from water surface which is treated by the agent, against the weight of the water evaporated from the nontreated water surface) reached over 80% and the rise of water temperature (which is the difference between the temperature of the water which is treated by the agent and that of the nontreated water) was 8° C. to 10° C. In spite of these excellent results, however, these fats and oils and mineral oils would cause a harmful reaction upon animals and plants when used in the intact state, and a large quantity of the agents was needed to form a thin film on water surface and to obtain the desired result. These facts would prevent their practical use.

In the United States of America, England and Australia, a number of researches have been done for the group of normal aliphatic alcohols whose number of carbon atoms is less than 18 in order to suppress water evaporation and inhibit the loss of water due to evaporation in dams and water reservoirs by spreading these alcohols or their mixture over water surface and by forming their molecular film, but the suppression rate of evaporation could not exceed 35% [Laycock and Harold, C., Water Works and Sewerage, volume 103, page 346 (1956); Robert, W. J., Transactions of the American Geophysical Union, volume 38, page 740 (1957)].

To prevent the influence of cool water upon the rearing of water-field rice plants in the north-eastern region of Japan, to permit harvesting two times in a year and to harvest before the typhoon in autumn in the south-western region of Japan, the early rearing method in which rice seedlings are reared in hotbed type-, vinyl film- or oil paper-covered and electric-warming nursery and the time of seeding and transplantation are advanced by a few weeks is becoming very popular. However, one of the disadvantages of this method is that the early reared rice seedlings are usually transplanted in the paddy-rice field in which the water temperature is lower than the nursery beds by 3° C. to 4° C., and until the water becomes warm enough for the growth of the rice plants they will not begin to grow again. Thus, the rootage of the seedlings is retarded and there are many cases where the advantages of the early transplantation can not be obtained as fully as desired. It has been desired, therefore, that the water temperature of the paddy-rice field should be raised artificially 3° C. to 4° C. It has been well known that the growth of the roots of water-field rice plant after transplantation is extremely influenced by the water temperature, particularly in spring time when both the temperature of air and water is low, and even the rise of only 1° C. of water temperature very much promotes the rooting, and that according to the circumstances only one degree's rise of water temperature at the panicle forming period is enough to prevent sterility of rice.

The inventors of this application have been occupied in studies to prevent the cool-water damage in the growing of water-field rice plants, and have aimed at the improvement of the growing method of water-field rice plants by suppressing the evaporation of water and raising the water temperature of the paddy-rice field, and after long investigation, have invented a series of new materials which have the excellent evaporation-suppressing and water-temperature-raising ability, can be spread easily on a water surface without being dissolved in any solvent, are suited to industrial production, and are inexpensive.

The following is the detailed description of this invention.

Although normal aliphatic alcohols whose number of carbon atoms is 16 to 22 have excellent evaporation-suppressing and water-temperature-elevating ability, a large quantity of the solvent is necessary for their spreading on a water surface, and therefore they are not suitable for practical use. This invention aims at the removing of this defect, and intends to obtain evaporation-suppressing agents which are prepared by combining normal aliphatic alcohol whose number of carbon atoms is 16 to 22 or their mixture, with ethylene oxide, or melting the mixture of these alcohols and certain kinds of surface active agents, and adding urea, water-soluble salts of carboxymethyl cellulose, or water-soluble salts of alginic acid to the material thus obtained.

In order to facilitate the spreading of normal aliphatic alcohols, whose number of carbon atoms is 16 to 22, on water surface, it is necessary to make these alcohols hydrophilic to some degree, and this object can be attained by combining one mole of the alcohol with less than 5 moles of ethylene oxide. It has been ascertained that normal docosanol, for example, has a most excellent effect and can be spread on water surface most easily when it combines with less than 5 moles of ethylene oxide.

The ethylene oxide derivatives of normal docosanol is prepared by reaction of normal docosanol with ethylene oxide in the presence of a small quantity of a catalyst, such as 3 to 5% of anhydrous sodium hydroxide or about 1% of sodium methylate at 100° C. to 110° C. in an autoclave.

The reaction product obtained in this way can be illustrated as the following formula.

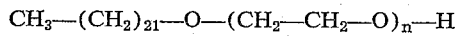

$$CH_3-(CH_2)_{21}-O-(CH_2-CH_2-O)_n-H$$

wherein $n = 1, 2, 3, 4$ and $5$.

Although many of ethers, which are the reaction products of normal aliphatic alcohols whose number of carbon atoms is less than 18 with ethylene oxide, have been used as surface active agents, they are emulsifying agents and are prepared by the reaction of normal aliphatic alcohols with more than 5 moles of ethylene oxide in order to have strong hydrophilic activity, and can not form their molecular film on water surface, and have other uses. The ethers of the reaction products of normal aliphatic alcohols whose number of carbon atoms is more than 20 with ethylene oxide have not been used as surface active agents because of their unproper properties.

Furthermore it has been apparent that the addition of urea or a kind of high molecular electrolyte, more particularly, water-soluble salts of carboxymethyl cellulose such as sodium, potassium and ammonium salt, and water-soluble salts of alginic acid such as sodium, potassium and ammonium salt, to the ethylene oxide derivatives of the alcohols can improve the spreadability and can simplify the process of use. Proper quantities of these substances which may be added are one-half to three times by weight of the ethylene oxide derivatives in case of urea, 5 to 20% by weight in a case of the water-soluble salt of carboxymethyl cellulose, and 10 to 50% by weight in the case of the water-soluble salt of alginic acid. The final products are obtained by mixing the ethylene oxide derivatives of alcohols melted at about 70° C. with urea, the water-soluble salts of carboxymethyl cellulose or the water-soluble salts of alginic acid, dissolved in warm water, by kneading them together thoroughly and by drying in vacuo at a temperature below 80° C.

In the above-mentioned instances, the normal aliphatic alcohols which are converted to the ethylene oxide derivatives are used alone, but they can also be used in their mixture and further as the alcohol mixture, which is obtained by hydrogenating directly or after ester interchanging the oil and fat which contains glyceride consisting of at least one of normal fatty acids whose number of carbon atoms is 16 to 22, and removing the liberated glycerine. In these cases the same or less volume by weight of ethylene oxide may be combined with the alcoholic mixture, namely, 5% to the same volume by weight is adequate.

As mentioned above, the normal aliphatic alcohols whose number of carbon atoms is 16 to 22 are good evaporation-suppressing agents by themselves, but because of their poor spreadability on water surface they cannot be used in the whole state. As shown previously, one of the methods which overcomes this defect is to combine the aliphatic alcohols or their mixture with less than 5 moles or the same or less volume by weight of ethylene oxide in order to give them some degree of hydrophilic activity, and further to add urea, the water-soluble salts of carboxymethyl cellulose or the water-soluble salts of alginic acid in order to improve their diffusion on water surface. The inventors of this invention have investigated and completed another method to improve the diffusion on water surface, that is, the method in which straight chain aliphatic alcohols whose number of carbon atoms is 16 to 22 are mixed with the ethylene oxide derivatives of these alcohols which are prepared by the reaction of one mole of these alcohols and less than 5 moles of ethylene oxide, or with the surface active agents which in their hydrophobic group do not contain aromatic or quaternary ammonium radical which increases the intermolecular interstices, and to this mixture the water-soluble salts of carboxymethyl cellulose or alginic acid are added.

As set forth above, any kind of surface active agents can be used in this invention unless they contain aromatic or quaternary ammonium radical in their hydrophobic group: that is, soap, sulfates, and sulfonates as the anionic surface active agents; long chain aliphatic amines and diamine derivatives as the cationic surface active agents; and ester-type, ether-type and their mixture-type of the non-ionic surface active agents, can be used.

Although the surface active agents have been well used to emulsify and suspend this kind of aliphatic alcohols, this is the first time that the evaporation-suppressing agents are prepared by the method in which aliphatic alcohols are mixed with the surface active agents which in their hydrophobic atomic group do not contain the aromatic or quaternary ammonium radical enlarging the intermolecular interstices and contain only the long chain aliphatic group and to the mixture the spread-promoting agents which are the water-soluble salts of carboxymethyl cellulose or alginic acid are added.

The said agents are prepared by mixing the normal aliphatic alcohols or their mixture with 10% to the same volume by weight of the said surface active agents, by melting this mixture at about 70° C., and further by adding the water-soluble salts of carboxymethyl cellulose or alginic acid such as sodium, potassium and ammonium salt to the melted mixture, by kneading at 75° C. to 90° C., drying in vacuo, and by pulverizing them.

The direction for use is quite simple, that is, the agents may be sprayed as being suspended in water on water and soil surface or wafted on water surface in the intact state or as being kneaded with water. The amount to be used is quite small, that is, 30 to 300 mg. per square meter of water surface.

The effect of the said agents is measured by means of the suppression rate of evaporation and the rise of water temperature. The former is obtained by measuring the weight of evaporated water in the dishes on a turn table in a room and in large enameled vats on a large turn table set up in an open field, and the latter is obtained by measuring the temperature difference between the water treated by the agent and the nontreated water contained in the vats on a large turn table in an open field and in a cement water-tank, the bottom of which is covered with mud imitating the actual condition of the paddy rice field and further in certain sections of paddy rice fields where practical. The suppression rate of evaporation of a series of the said agents amounts to over 85% and the rise of water temperature reaches 9.5° C.

When the evaporation-suppressing agents in this invention are suspended in water and sprayed on the surface of nursery, farm land, lawn, and water-cement paste, they form thin films on the surface and suppress evaporation of water and drying of soil and water-cement paste.

In Japan, the Hoon-Setchu Nursing method in which rice seeds are sown on farm land which is covered with oilpaper or a film of vinyl chloride or polyester, is rapidly coming into wide use. The advantage of this method lies in the fact that the seedlings grown in this method strike roots immediately on transplantation. On the other hand, some disadvantage occurs in this method, that is, the vapor of the water evaporated from the soil surface condenses on the inside of the covering film and the condensed water streams down the inside of the film. Therefore, the water content of the soil in the perimeter of the nursery becomes greater than that in the center and the water distribution in the nursery becomes uneven. Consequently, the seedlings grow better in the perimeter than in the center of the nursery. When the said agents are spread on the soil surface of the nursery at the rate of about 10 grm. per square meter, evaporation is suppressed, condensation of the water vapor on the inside of the film lessens, the water distribution in the nursery does not become uneven, the soil temperature is raised and the growth of the seedlings is accelerated. At the same time, as the drying and the solidifying of the soil of the nursery can be suppressed, the volume and the number of the times of sprinkling of water can be reduced.

As apparent from the theory of the use, these agents can prevent the loss of water and the fall of water temperature on being spread on the water surface of dams and water reservoirs.

The invention is further described in the following examples, which serve to illustrate the effects, method of the production and the direction for use of the evaporation-suppressing agents of the present invention.

*Example 1*

To a mixture of 326 grm. of normal docosanol and 4 grm. of sodium methylate in the autoclave in which air was substituted with nitrogen, 44 grm. of gaseous ethylene oxide was added through a pipe. After shutting the valve of the pipe, the mixture was heated at 100° C. to 110° C. with stirring. The reaction was completed in about 30 minutes, and 362 grm. of monooxyethylene docosanol was obtained as the reaction product.

The indoor measurement of the suppression rate of evaporation was effected by using a small turn table whose diameter was 70 cm., rotating speed was 1 round per minute, and which carried 12 glass dishes containing about 200 cc. of distilled water, radiated by an infrared lamp (100 volt, 250 watt) for 3 hours from a distance of 20 cm. above them. Some of the dishes were treated with the agents and others were not. The suppression rate of evaporation was obtained by measuring the weight of the evaporated water in each dish before and after the test. The agent was used as 0.1% water suspension.

When 5, 10, 20, 30 and 50 times of the theoretical amount of the agent (which is the amount necessary to form mono-molecular film and calculated from the space taken by one molecule of the agent) were used, the suppression rate of evaporation were 50%, 58%, 60%, 61%, and 63% respectively.

In an open field for meterological observation the measurement of the suppression rate of evaporation and the rise of water temperature were made by using a large turn table whose diameter was 150 cm., rotating speed was 1 round per 5 minutes, and which carried white enameled vats (40 cm. x 50 cm.) containing 3,000 cc. of distilled water. In the same way as the indoor test, the suppression rate of evaporation and the rise of water temperature measured after 6 hours disposure to air were 80% and 9.4° C., respectively.

*Example 2*

When 88 grm., 132 grm., 176 grm. and 220 grm. of ethylene oxide were used instead of 326 grm. in the reaction of Example 1, the products were 406 grm. of dioxyethylene docosanol, 450 grm. of trioxyethylene docosanol, 492 grm. of tetraoxyethylene docosanol, and 536 grm. of pentaoxyethylene docosanol respectively.

The suppression rate of evaporation of these agents measured indoors in the same way as in Example 1 was as follows.

| | Suppress. rate of evaporation | | | | |
|---|---|---|---|---|---|
| Spread amount¹ | 5 | 10 | 20 | 30 | 50 |
| Agent: | | | | | |
| Dioxyethylene docosanol | 46 | 46 | 46 | 44 | 46 |
| Trioxyethylene docosanol | 41 | 42 | 42 | 43 | 46 |
| Tetraoxyethylene docosanol | 18 | 21 | 21 | 20 | 28 |
| Pentaoxyethylene docosanol | ------ | 5 | 14 | ------ | 12 |

¹ The figures represent how many times the theoretical amount of the agents were used.

*Example 3*

When 270 grm. of stearyl alcohol and 241 grm. of cetanol were used in place of 326 grm. of normal docosanol in the reaction of Example 1, the products were 308 grm. of monooxyethylene stearyl alcohol and 279 grm. of monooxyethylene cetanol, respectively.

The suppression rate of evaporation and the rise of water temperature measured indoors and outdoors in a like manner as in Example 1 were as follows.

| | Indoors | | | | | Outdoors | |
|---|---|---|---|---|---|---|---|
| | Suppression rate of evaporation | | | | | Suppress. rate of evaporat. | Rise of water temp., ° C. |
| Spread amount¹ | 5 | 10 | 20 | 30 | 50 | 20 | 20 |
| Agent: | | | | | | | |
| Monooxyethylene stearyl alcohol | 20 | 21 | 23 | 24 | 25 | 31 | 5.5 |
| Monooxyethylene cetanol | 2 | 4 | 10 | 10 | 11 | 27 | 4.4 |

¹ The figures represent how many times the theoretical amount of the agents were used.

*Example 4*

One hundred grams of monooxyethylene docosanol melted by warming at about 70° C. was added to a solution of 150 grm. of urea in 150 cc. of warm water. The mixture was stirred at 75° C. to 95° C. for about 30 minutes, and then dried under reduced pressure at below 80° C. The reaction product was 250 grm. of the urea adduct of monooxyethylene docosanol.

The indoor suppression rate of evaporation of this product when 10, 20, 30 times of the theoretical amount was used was 60%, 66% and 70%, respectively.

The suppression rate of evaporation and the rise of water temperature measured in an open field were 82% and 9.5° C. when 20 times of the theoretical amount was sure below 80° C.

*Example 5*

When the weight ratios of monooxyethylene docosanol to urea were 1:0.5, 1:1, 1:2, and 1:2.8 in this Example 4, the indoor suppression rates of evaporation of the agents were as follows.

|  | Suppress. rate of evaporation | | |
|---|---|---|---|
| Spread amount [1] | 10 | 20 | 30 |
| Ratio: [2] | | | |
| 1:0.5 | 51 | 57 | 65 |
| 1:1 | 55 | 58 | 60 |
| 1:2 | 46 | 50 | 67 |
| 1:2.8 | 35 | 50 | 62 |

[1] The figures represent how many times the theoretical amount of the agents were used.

[2] The figures in this column are the weight ratios of monooxyethylene docosanol added to urea.

Example 6

One hundred grams of monooxyethylene docosanol melted by warming at about 70% C. were added to 5 grm., 10 grm., and 20 grm., respectively, of sodium salt of carboxymethyl cellulose dissolved in 200 cc. of warm water. The mixture was stirred at the same temperature for about 30 minutes, and then dried under reduced pressure below 80° C.

The suppression rate of evaporation and the rise of water temperature of this product were as follows.

|  | Indoor | | Outdoor | |
|---|---|---|---|---|
|  | Suppress. rate of evaporation | | Suppress. rate of evaporat. | Rise of water temp., °C. |
| Spread amount [1] | 3 | 6 | 10 | 20 | 20 |
| Amount of CMC added (percent by weight): [2] | | | | | |
| 5 | 40 | 65 |  | 72 | 4.5 |
| 10 | 70 | 75 | 78 | 82 | 5.4 |
| 20 | 35 | 52 |  | 59 | 3.5 |

[1] The figures represent how many times the theoretical amount of the agent was used.
[2] CMC is the abreviation of sodium carboxymethyl cellulose.

Example 7

When 10% by weight of sodium carboxymethyl cellulose was mixed with monooxyethylene stearyl alcohol, monooxyethylene cetanol and urea adduct of monooxyethylene docosanol instead of monooxyethylene docosanol in Example 6, the suppression rate of evaporation and the rise of water temperature of the products were as follows.

|  | Indoor | Outdoor | |
|---|---|---|---|
|  | Suppress. rate of evaporat. | Suppress. rate of evaporat. | Rise of water temp.,°C. |
| Spread amount [1] | 10 | 20 | 20 |
| Agent: | | | |
| Monooxyethylene stearyl alcohol mixed with 10% vol. by weight of CMC [2] | 64 | 82 | 4.7 |
| Monooxyethylene cetanol mixed with 10% vol. by weight of CMC | 51 | 79 | 4.2 |
| Urea adduct of monooxyethylene docosanol mixed with 10% vol. by weight of CMC | 70 |  |  |

[1] These figures represent how many times the theoretical amount of the agents were used.
[2] CMC in this table is the abbreviation of sodium carboxymethyl cellulose.

Example 8

A mixture of 50 grm. of monooxyethylene docosanol, 10 grm. of pentaoxyethylene docosanol and 40 grm. of docosanol was melted by warming at about 70° C., and added to a solution of 10 grm. of sodium carboxymethyl cellulose dissolved in 200 cc. of warm water. The mixed solution was stirred at the same temperature for about 30 minutes and then dried under reduced pressure below 80° C. The suppression rate of evaporation of this product was 74% and the rise of water temperature was 3.6° C. The weather of the open field under which the measurement was made, was fair, air temperature 8.5° C., relative humidity 34%, wind velocity 2 meters per second, and water temperature 7.8° C. to 9.5° C.

Example 9

One hundred grams of monooxyethylene docosanol melted by warming at about 70° C. was added to a solution of 12.5 grm., 25 grm. and 50 grm. of sodium alginate dissolved in 200 cc. of warm water, and the mixture was stirred at the same temperature for about 30 minutes and then dried under reduced pressure below 80° C.

The suppression rate of evaporation and the rise of water temperature were as follows.

|  | Indoor | | Outdoor | |
|---|---|---|---|---|
|  | Suppress. rate of evaporat. | | Suppress. rate of evaporat. | Rise of water temp., °C. |
| Spread amount [1] | 3 | 6 | 10 | 20 | 20 |
| Amount of sodium alginate added (percent by weight): | | | | | |
| 12.5 | 41 | 64 |  | 70 | 4.3 |
| 25 | 72 | 74 | 78 | 83 | 5.5 |
| 50 | 35 | 50 |  | 57 | 3.2 |

[1] The figures represent how many times the theoretical amount of the agents were used.

Example 10

When 25% volume by weight of sodium alginate was respectively mixed with monooxyethylene stearyl alcohol, monooxyethylene cetanol and urea adduct of monooxyethylene docosanol in place of monooxyethylene docosanol in Example 9, the suppression rate of evaporation and the rise of water temperature were as follows.

|  | Indoor | Outdoor | |
|---|---|---|---|
|  | Suppress. rate of evaporat. | Suppress. rate of evaporat. | Rise of water temp.,°C. |
| Spread amount [1] | 10 | 20 | 20 |
| Agent: | | | |
| Monooxyethylene stearyl alcohol mixed with 25% volume by weight of sodium alginate | 63 | 80 | 4.5 |
| Monooxyethylene cetanol mixed with 25% volume by weight of sodium alginate | 50 | 70 | 3.5 |
| Urea adduct of monooxyethylene docosanol mixed with 25% volume by weight of sodium alginate | 72 |  |  |

[1] These figures represent how many times the theoretical amount of the agents were used.

Example 11

A mixture of 50 grm. of monooxyethylene docosanol, 10 grm. of pentaoxyethylene docosanol and 40 grm. of docosanol was melted by warming at about 70° C., and added to a solution of 25 grm. of sodium alginate dissolved in 200 cc. of warm water. The mixed solution was stirred at the same temperature for about 30 minutes and dried under reduced pressure below 80° C. The suppression rate of evaporation of this product was 75% and the rise of water temperature was 3.5° C. as measured in an open field. The weather under which the measurement was made, was fair, air temperature 10° C., relative humidity 28%, wind velocity 2 meters per second and water temperature 8° C. to 10° C.

*Example 12*

A mixture of 1.5 liter (1.38 kg.) of the rapeseed oil and 255 cc. of methanol was refluxed for 5 minutes with agitation at 80° C. in the presence of 5.4 grm. of sodium hydroxide. After standing at the same temperature for one hour, the lower layer (which was the waste consisting mainly of glycerine) was discarded and the upper layer was washed three times with 5 liters of warm water (at about 50° C.). The mixture of the higher fatty acid methyl esters thus obtained was dried with 75 to 100 grm. of anhydrous sodium sulfate; yield 1.25 kg. (90.5% of the theoretical amount).

Six hundred seventy grams of the mixture of the higher fatty acid methyl esters mentioned above was hydrogenated in the presence of 34 grm. of copper chromium catalyst at 260° C., under a pressure of 300 kg. per square centimeter. The reaction was completed in three hours; the catalyst was filtered off, and the product was the mixture of higher alcohols; yield 604 grm. (90%).

While in an autoclave 260 grm. of the said mixture of the higher aliphatic alcohols was added to 1.3 grm. of sodium hydroxide. After replacing the air in the autoclave with nitrogen, 52.8 grm. of gaseous ethylene oxide was introduced through a pipe. After closure of the valve of the pipe, the content was heated to 100° C. to 130° C. with stirring. The reaction was completed in about one hour and the mixture of the ethylene oxide derivatives of the higher aliphatic alcohols was obtained; yield 312 grm. (99.5%).

The suppression rate of evaporation and the rise of water temperature of the final product which was obtained by kneading this ethylene oxide derivative of the alcoholic mixture together with 10% volume by weight of sodium carboxymethyl cellulose were as follows. In the following table the amount used was 10 times of the theoretical amount.

| Range of water temp., ° C | 9–14 | | 15–20 | | 21–25 | |
|---|---|---|---|---|---|---|
| | A[1] | B[2] ° C. | A[1] | B[2] ° C. | A[1] | B[2] ° C. |
| AGENTS | | | | | | |
| Ethylene oxide derivative of alcoholic mixture obtained from rapeseed oil: | | | | | | |
| Indoor | 69 | ------ | 70 | ------ | 72 | ------ |
| Outdoor | 67 | 3.8 | 70 | 4.0 | 72 | 4.0 |
| Ethylene oxide derivative of alcoholic mixture obtained from rape-seed oil mixed with 10% volume by weight of sodium carboxymethyl cellulose: | | | | | | |
| Indoor | 73 | ------ | 73 | ------ | 75 | ------ |
| Outdoor | 70 | 4.0 | 72 | 4.1 | 75 | 4.5 |

[1] A is the suppression rate of evaporation.
[2] B is the rise of water temperature.

*Example 13*

In the same manner as in Example 12, the mixture of the higher aliphatic alcohols obtained by ester interchange and subsequent hydrogenation of whale oil and soybean oil was reacted with 16 to 17% volume by weight of ethylene oxide and the product thus obtained was kneaded together with 10% volume by weight of sodium carboxymethyl cellulose. The suppression rate of evaporation of the final product measured indoors was 69.5% and 58.0%, respectively. The amount used was 80 mg. per square meter.

*Example 14*

The measurement of the rise of water temperature caused by the agents listed in the following table was made of the water in the 8 cement water tanks (90 cm. x 90 cm.) in an open field, which had muddy bottoms in order to imitate the practical condition of paddy-rice field and 3 cm. to 10 cm. of water depth. Two tanks were standard, which had free water surface and the rest were treated by the agent. The weather under which the measurement was made, was half fair, average air temperature 20° C., average wind velocity 2 meters per second, average relative humidity 60%. The experiment began at 9 a.m. Each agent was used at 0.1% water suspension and the amount used was 20 times of the theoretical amount.

| Agent | Time | | | | | Max. of rise of water temp. |
|---|---|---|---|---|---|---|
| | 10 a.m. | 12 a.m. | 2 p.m. | 4 p.m. | 6 p.m. | |
| Monooxyethylene docosanol: | | | | | | |
| Water temp | 24.3 | 28.7 | 30.9 | 26.0 | 22.8 | -------- |
| Rise of water temp | 2.2 | 3.2 | 4.6 | 4.0 | 2.8 | 4.6 |
| Monooxyethylene stearyl alcohol: | | | | | | |
| Water temp | 23.9 | 28.3 | 29.6 | 24.9 | 22.3 | -------- |
| Rise of water temp | 1.8 | 2.8 | 3.3 | 2.9 | 2.3 | 3.3 |
| Monooxyethylene cetanol: | | | | | | |
| Water temp | 23.7 | 27.7 | 29.0 | 24.5 | 22.0 | -------- |
| Rise of water temp | 1.6 | 2.2 | 2.7 | 2.5 | 2.0 | 2.7 |
| Docosanol in 20% acetone: | | | | | | |
| Water temp | 24.1 | 28.5 | 30.5 | 25.8 | 22.5 | -------- |
| Rise of water temp | 2.0 | 3.0 | 4.2 | 3.8 | 2.5 | 4.2 |
| Standard (nontreated): | | | | | | |
| Water temp | 22.1 | 25.5 | 26.3 | 22.0 | 20.0 | -------- |

*Example 15*

Under the weather condition of average air temperature of daytime 23° C. and average wind velocity 2 meters per second, four experimental paddy-rice field sections (4.5 m. x 10.8 m.) were used to measure the rise of water temperature caused by the agent. Two of them were treated with the agent and the rest were not treated. The temperature of water was measured at 8 locations in each section, and at each location the temperature of water surface, of the middle and of the bottom thereof were measured. Therefore, 48 measurements were made at each designated time.

The following table is one of the results obtained by spreading out monooxyethylene docosanol on water surface in an amount of 30 times of the theoretical amount as 0.1% water suspension.

| Time | At beginning 9 a.m. | 11 a.m. | 1 p.m. | 3 p.m. | 5 p.m. | 7 p.m. | 9 p.m. | 11 p.m. |
|---|---|---|---|---|---|---|---|---|
| Rise of water temp., ° C | ------ | 2.8 | 4.3 | 4.7 | 3.2 | 2.5 | 1.8 | 1.2 |

*Example 16*

Water suspension of OED 13 (namely, pasty material which is prepared by adding of 10% volume by weight of sodium carboxymethyl cellulose and a small quantity of water to the mixture of the equal quantity of ethylene oxide derivatives of docosanol in which the mole ratio of ethylene oxide to docosanol is 1:0.5, 1:0.75, 1:1.0 and 1:1.5 respectively), OED 70 (material that is prepared by adding of 10% volume by weight of sodium carboxymethyl cellulose to the mixture of the equal quantity of ethylene oxide derivatives of the alcoholic mixture, obtained from the rapeseed oil in the same way as in Example 12, in which the mole ratio of ethylene oxide to the alcoholic mixture is 1:0.5 and 1:1.5 respectively) and OEC (oxyethylene cetanol, that is, the reaction product of 1 mole of cetanol and 1 mole of ethylene oxide), was respectively sprinkled on the soil surface of the flower pots. The volume of the water suspension used was 20 mm. in depth and the amount of the agents in it was 0.2 grm., 2.0 grm. and 20.0 grm. per square meter. All flower pots were exposed to the sunlight, and the volume of the evaporated water from the flower pots treated with the agent was compared with that from the nontreated flower pots. The result is shown in the following table. In all cases, the evaporation-suppressing effect was the greatest when the spread amount was 20.0 grm. per square meter, and in the first day the volume of the evaporated water was only 13 to 22% of that in the standard flower pots which were not treated with any agent, and in even 4 days was only 36 to 45%, while in the standard flower pots, more than the volume of the sprinkled water was evaporated. The evaporation-suppressing effect lowers with the decrease of the sprinkled volume, but even when the sprinkled volume was 2.0 grm. per square meter, the volume of the evaporated water was 57% in 24 hours and 57% in 48 hours, that is, about 50% on the average of that of the standard flower pots.

| Agent | Weight of spread agent (g./m.²) | After 24 hours | | After 48 hours | | After 96 hours | |
|---|---|---|---|---|---|---|---|
| | | Vol. of evap. water (mm.) | Percentage of evap. against standard (percent) | Vol. of evap. water (mm.) | Percentage of evap. against standard (percent) | Vol. of evap. water (mm.) | Percentage of evap. against standard (percent) |
| OED 13 | 0.2 | 8.3 | 91.2 | 15.6 | 91.2 | 24.3 | 96.5 |
| | 2.0 | 5.1 | 56.1 | 11.0 | 64.3 | 20.1 | 79.8 |
| | 20.0 | 2.0 | 22.0 | 5.1 | 29.8 | 11.3 | 44.8 |
| OED 70 | 0.2 | 8.1 | 88.9 | 15.2 | 88.9 | 24.1 | 95.6 |
| | 2.0 | 4.7 | 51.6 | 10.2 | 59.7 | 18.9 | 75.0 |
| | 20.0 | 1.3 | 14.3 | 4.1 | 23.9 | 9.5 | 37.7 |
| OEC | 0.2 | 7.9 | 88.6 | 15.1 | 88.4 | 23.8 | 94.6 |
| | 2.0 | 4.3 | 47.3 | 9.8 | 57.2 | 17.5 | 69.5 |
| | 20.0 | 1.2 | 13.2 | 4.0 | 23.4 | 9.1 | 36.0 |
| Standard | | 9.1 | 100 | 17.1 | 100 | 25.2 | 100 |

*Example 17*

A solution of 10 grm. of sodium carboxymethyl cellulose in 200 cc. of warm water was added to a mixture of 50 grm. of an ordinary soap and 50 grm. of docosanol melted by warming at about 70° C. The mixed solution was stirred at the same temperature for about 30 minutes and dried under reduced pressure below 80° C.

When this product was tested in an open field in the same manner as in Example 1, the suppression rate of evaporation was 58% and the rise of water temperature was 3.7° C. The amount used was 80 mg. per square meter, and the contrast water temperature was 25° C.

*Example 18*

A solution of 25 grm. of sodium alginate in 200 cc. of warm water was added to a mixture of 25 grm. of docosanol, 25 grm. of stearyl alcohol and 50 grm. of sodium cetyl sulfate, melted by warming at about 70° C. The mixed solution was stirred at the same temperature for about 30 minutes and dried under reduced pressure below 80° C.

When this product was tested in an open field in the same manner as in Example 1, the suppression rate of evaporation was 76.1% and the rise of water temperature was 5.8° C. The amount used was 90 mg. per square meter and the contrast water temperature was 15° C.

*Example 19*

A solution of 10 grm. of sodium carboxymethyl cellulose in 200 cc. of warm water was added to a mixture of 40 grm. of docosanol, 40 grm. of stearyl alcohol and 20 grm. of polyoxyethylene sorbitan monostearate, melted by warming at about 70° C. The mixed solution was stirred at the same temperature for about 30 minutes, and dried under reduced pressure below 80° C.

When this product was tested in an open field in the same manner as in Example 1, the suppression rate of evaporation was 69.5% and the rise of water temperature was 4.8° C. The amount used was 80 mg. per square meter and the contrast water temperature was 14° C.

*Example 20*

A solution of 10 grams of sodium carboxymethyl cellulose in 200 cc. of warm water was added to a mixture of 50 grm. of polyoxypropylene docosanol and 50 grm. of cetanol, melted by warming at about 70° C. The mixed solution was stirred at the same temperature for about 30 minutes and dried under reduced pressure below 80° C.

When this product was tested in an open field in the same manner as in Example 1, the suppression rate of evaporation was 75% and the rise of water temperature was 5.4° C. The amount used was 80 mg. per square meter and the contrast water temperature was 14° C.

*Example 21*

A solution of 10 grm. of urea and 10 grm. of sodium carboxymethyl cellulose in 200 cc. of warm water was added to a mixture of 50 grm. of stearyl alcohol and 50 grm. of behenic acid amide, melted by warming at about 70° C. The mixed solution was stirred at the same temperature for about 30 minutes and dried under reduced pressure below 80° C.

When this product was tested in an open field in the same manner as in Example 1, the suppression rate of evaporation was 74.7% and the rise of water temperature was 5.2° C. The amount used was 90 mg. per square meter and the contrast water temperature was 21° C.

*Example 22*

A solution of 10 grm. of sodium carboxymethyl cellulose in 200 cc. of warm water was added to a mixture of 25 grm. of docosanol, 25 grm. of stearyl alcohol and 50 grm. of Turkey red oil, melted by warming at about 70° C. The mixed solution was stirred at the same temperature for about 30 minutes and dried under reduced pressure below 80° C.

When this product was tested in an open field in the same manner as in Example 1, the suppression rate of evaporation was 79.6% and the rise of water temperature was 5.8° C. The amount used was 80 mg. per square meter and the contrast water temperature was 18° C.

*Example 23*

A solution of 10 grm. of sodium carboxymethyl cellulose in 200 cc. of warm water was added to a mixture of 25 grm. of docosanol, and 25 grm. of stearyl alcohol and 50 grm. of potassium laurate, melted at about 70° C. The mixed solution was stirred at the same temperature for about 30 minutes and dried under reduced pressure below 80° C.

When this product was tested in an open field in the same manner as in Example 1, the suppression rate of evaporation was 78% and the rise of water temperature was 5.9° C. The amount used was 80 mg. per square meter and the contrast water temperature was 20° C.

*Example 24*

A solution of 25 grm. of sodium alginate in 200 cc. of warm water was added to a mixture of 50 grm. of stearyl alcohol and 50 grm. of Turkey red oil, melted by warming at about 70° C. The mixed solution was stirred at the same temperature for about 30 minutes and dried under reduced pressure below 80° C.

When this product was tested in an open field in the same manner as in Example 1, the suppression rate of evaporation was 67.2% and the rise of water temperature was 4.7° C. The amount used was 90 mg. per square meter and the contrast water temperature was 22° C.

*Example 25*

A solution of 25 grm. of sodium alginate in 200 cc. of warm water was added to a mixture of 25 grm. of docosanol, 25 grm. of stearyl alcohol and 50 grm. of ordinary soap, melted by warming at about 70° C. The mixed solution was stirred at the same temperature for about 30 minutes and dried under reduced pressure below 80° C.

When this product was tested in an open field in a like manner as in Example 1, the suppression rate of evaporation was 58.5% and the rise of water temperature was 3.8° C. The amount used was 90 mg. per square meter and the contrast water temperature was 20° C.

*Example 26*

Water suspension of OED 70 (which is prepared by adding 10% by weight of sodium carboxymethyl cellulose to a mixture of equal quantity of ethylene oxide derivatives of the alcoholic mixture, obtained from the rapeseed oil in the same way as that of Example 12, in which the mole ratio of ethylene oxide to the alcoholic mixture is 1:0.5 and 1:1.5, respectively) was sprayed on farm land nursery sown with rice seeds and covered with vinyl chloride film. The amount used was 5 grm. per square meter. Unevenness of the growth of the rice seedlings occurs in the standard nursery which was not treated with the agent. In the nursery treated with the agent, on the contrary, the volume of the evaporated water from the soil surface of the nursery and the volume of the condensed water on the inside of the covering film were very small, and the air temperature in the film was kept high, and flow of the condensed water along the inside of the film did not occur, and so irregularity of the water content of the soil was not observed. Consequently, the growth of the rice seedlings was very good and even.

The following table shows the result of the comparison of the number of the times; the volume of sprinkling after sowing of seeds; the water distribution in soil, and the difference of the growth of the seedlings between the nurseries which were treated with the agent and were not treated.

|  | Standard nursery | Treated nursery |
|---|---|---|
| Sprinkled volume at the time of sowing (liter/m.²) | 20 | 20 |
| Number of the times of sprinkling for 20 days after sowing | 2 | 0 |
| Sprinkled volume for 20 days after sowing (liter) | 4 | 0 |
| Water content of soil at 30th day after sowing (percent): | | |
| East side | 43 | 38 |
| Center | 28 | 36 |
| West side | 40 | 35 |
| Growth of seedlings at 30th day after sowing (height, cm.): | | |
| East side | 5.6 | 6.9 |
| Center | 3.3 | 6.8 |
| West side | 5.5 | 6.8 |
| Weight of dried roots from 30 seeds (mg.): | | |
| East side | 28 | 48 |
| Center | 25 | 52 |
| West side | 30 | 47 |

*Example 27*

Water-evaporation-suppressing agents listed in the following table were sprinkled on the soil surface of the flower pots. The amounts used were 0.2 grm., 2.0 grm. and 20.0 grm. per square meter. All flower pots were exposed to the sunlight, and the volume of the evaporated water from the flower pots treated with the agents were compared with that from the nontreated flower pots. The result is shown in the following table.

| | Components of agent | Ratio of component (by weight) | Amount of agent used (g./m.²) | After 24 hours | |
|---|---|---|---|---|---|
| | | | | Volume of evap. water (mm.) | Percentage [1] |
| I | Docosanol | 50 | 0.2 | 8.3 | 90.3 |
| | Soap | 50 | 0.2 | 5.0 | 54.4 |
| | Sodium carboxymethyl cellulose | 10 | 20.0 | 2.0 | 21.8 |
| II | Docosanol | 25 | 0.2 | 4.4 | 47.8 |
| | Stearyl alcohol | 25 | 2.0 | 2.5 | 27.2 |
| | Sodium cethyl sulfate | 50 | 20.0 | 1.2 | 13.1 |
| III | Docosanol | 40 | 0.2 | 6.2 | 67.4 |
| | Stearyl alcohol | 40 | | | |
| | Polyoxyethylene sorbitan monostearate | 20 | 2.0 | 3.8 | 41.3 |
| | Sodium carboxymethyl cellulose | 10 | 20.0 | 1.4 | 15.2 |
| IV | Cetanol | 50 | 0.2 | 5.1 | 55.5 |
| | Polyoxypropylene docosanol | 50 | 2.0 | 3.1 | 33.7 |
| | Sodium carboxymethyl cellulose | 10 | 20.0 | 1.3 | 14.1 |
| V | Stearyl alcohol | 50 | 0.2 | 5.5 | 59.8 |
| | Behenic acid amide | 50 | | | |
| | Urea | 10 | 2.0 | 3.1 | 33.7 |
| | Sodium carboxymethyl cellulose | 10 | 20.0 | 1.3 | 14.0 |
| VI | Docosanol | 25 | 0.2 | 4.1 | 44.6 |
| | Stearyl alcohol | 25 | | | |
| | Turkey red oil | 50 | 2.0 | 2.6 | 28.2 |
| | Sodium carboxymethyl cellulose | 10 | 20.0 | 1.0 | 10.9 |
| VII | Docosanol | 25 | 0.2 | 4.5 | 49.0 |
| | Stearyl alcohol | 25 | | | |
| | Potassium laurate | 50 | 2.0 | 2.8 | 30.0 |
| | Sodium carboxymethyl cellulose | 10 | 20.0 | 1.2 | 13.0 |
| VIII | Stearyl alcohol | 50 | 0.2 | 6.9 | 75.0 |
| | Turkey red oil | 50 | 2.0 | 3.2 | 34.8 |
| | Sodium alginate | 25 | 20.0 | 1.7 | 18.5 |
| IX | Docosanol | 25 | 0.2 | 8.3 | 90.3 |
| | Stearyl alcohol | 25 | | | |
| | Soap | 50 | 2.0 | 5.1 | 55.5 |
| | Sodium alginate | 25 | 20.0 | 2.0 | 21.8 |
| Standard (nontreated) | | | | 9.2 | 100.0 |

[1] The figures in this column represent the percentage of the volume of the evaporated water from the flower pot which was treated with the agents against that of the flower pot which was not treated with any agent.

What we claim is:

1. A method of reducing evaporation of water from water surfaces which are exposed to the atmosphere, comprising the step of spreading on said surface as an interface between said surface and the atmosphere a thin film of material of the following formula:

$$CH_3-(CH_2)_m-O-(CH_2-CH_2-O)_n-H$$

wherein $m$ is 15–21 and $n$ is 1–5.

2. A method as claimed in claim 1, in which said material is present as an adduct with urea.

3. A method as claimed in claim 1, in which said surface is the surface of a liquid body of water and the weight of said film is about 30–300 mg. per square meter.

4. A method as claimed in claim 1, in which said surface is the surface of water in a water-permeable solid and the weight of said film is about 0.2–20.0 grams per square meter.

References Cited in the file of this patent
UNITED STATES PATENTS

| 1,970,578 | Schoeller et al. | Aug. 21, 1934 |
| 2,105,278 | Van der Minne | Jan. 11, 1938 |
| 2,316,258 | Kummel | Apr. 13, 1943 |
| 2,665,256 | Barker | Jan. 5, 1954 |
| 2,814,612 | Desty et al. | Nov. 26, 1957 |

OTHER REFERENCES

United States Department of Interior Chemical Engineering Laboratory Report No. SI–12, July 8, 1957, pages 1 to 12 and Tables 1 to 4.